(No Model.)  F. M. LUCAS.  2 Sheets—Sheet 1.
CORN PLANTER.

No. 323,942.  Patented Aug. 11, 1885.

Witnesses.  Inventor.
A. Ruppert,  Francis M. Lucas,
R. E. Grant  Per
  Thomas P. Simpson,
  Attorney.

(No Model.)  F. M. LUCAS.  2 Sheets—Sheet 2.
CORN PLANTER.

No. 323,942.  Patented Aug. 11, 1885.

Witnesses.
A. Ruppert,
R. E. Grant

Inventor:
Francis M. Lucas,
Per
Thomas J. Simpson
Attorney,

UNITED STATES PATENT OFFICE.

FRANCIS M. LUCAS, OF YORK, NEBRASKA.

CORN-PLANTER.

SPECIFICATION forming part of Letters Patent No. 323,942, dated August 11, 1885.

Application filed October 27, 1884. (No model.)

*To all whom it may concern:*

Be it known that I, FRANCIS M. LUCAS, of York, in the county of York and State of Nebraska, have invented a Corn-Planter, of which the following is a specification.

The special object of my invention is to list ground and plant corn with as little inconvenience as possible to the operator; also, to enable him to see in a moment when the flow of seed is interrupted or impeded; also, to plant the grain at a uniform and not too great a depth.

I will first describe the means which I have invented for carrying out these objects, in connection with the drawings, and then point them out in the claims.

Figure 1:
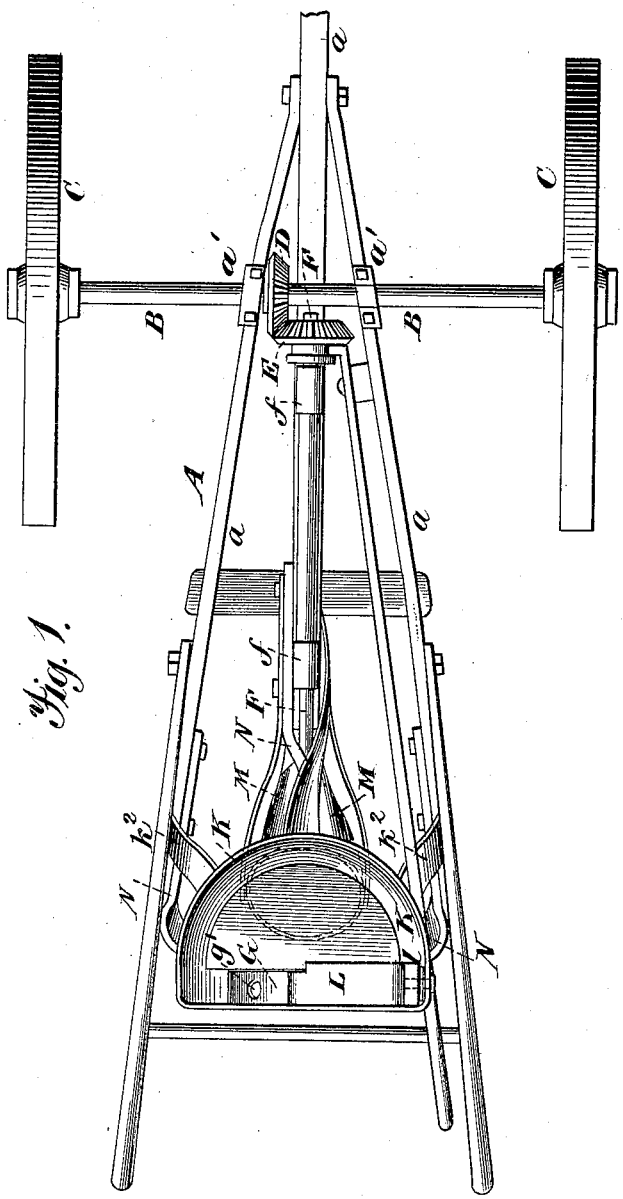
Figure 3:
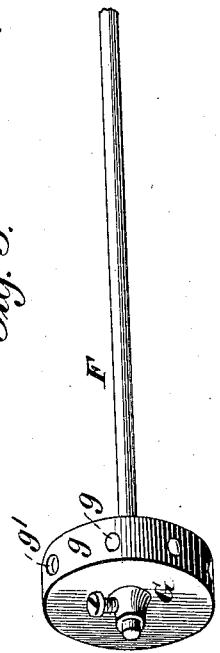

On Sheet 1 of the drawings, Figure 1 is a plan view looking down upon the upper side of my planter. Fig. 3 is a detail view of the dropping devices.

Figure 2:
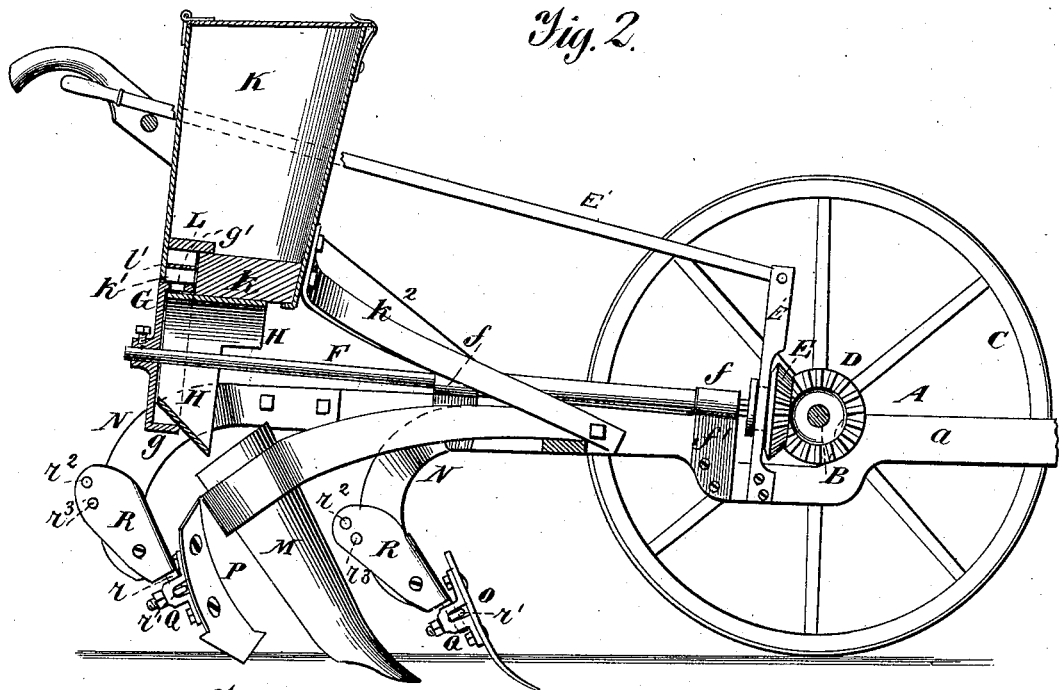
Figure 5:
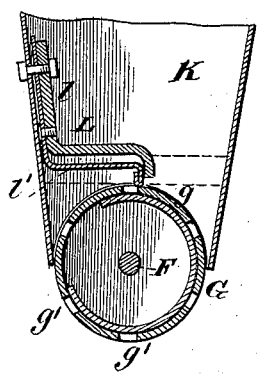
Figure 4:
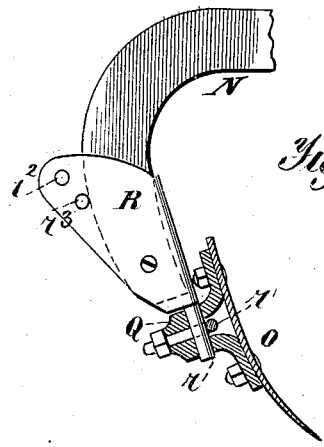

On Sheet 2 of the drawings, Fig. 2 is longitudinal vertical section, and Fig. 4 a detail view of the devices by which the plows are connected with their standards. Fig. 5 is a vertical section through hopper and dropper.

In the drawings, A represents the planter-frame consisting of three longitudinal beams, $a$, and at its front end provided with the bearings $a'$ $a'$, arranged on the top thereof. In these bearings rotates an axle, B, carrying the ground-wheels C C, and on this axle is located a fast crown-wheel, D, which gears with a spur-wheel, E. The latter is fast upon a longitudinal shaft, F, which is journaled in bearings $f f$ on uprights $f' f'$, attached to the middle beam of the frame. E' is the mechanism for gearing or ungearing the wheels D E. At the rear end of shaft F, I place the seed measuring and dropping wheel G, which is formed of an imperforate plate having the right-angled flange $g$ perforated at $g'$. These perforations, holes, or cups in the flange $g$ are placed at such intervals as to drop the corn six, eight, ten, or any desired number of inches apart, and may contain one or more grains. This dropping-wheel revolves around a circular plate, H, made fast to the bottom $k$ of the hopper K. This circular plate H is dished or inclined and cut out where it comes under the hopper-outlet $k'$, so as to receive the corn from the dropper and convey it to the delivery-spout.

The hopper K is provided on the inside with an angular slide-plate, L, which may be adjusted by screws and by changeable plates of leather or other substance between its vertical arm $l'$ and the hopper, so as to regulate the size of the grain-outlet $k'$. The hopper itself is sustained on the braces $k^2 k^2$, so as to extend up between the handles and bring its interior constantly under the eye of the workman. The latter is thus enabled to notice any impediment or choking of the seed on the instant that it occurs, and thus prevent any ground or part of the furrow from being left without its proper supply of seed.

As the ground-wheels rotate the axle the mechanism turns the dropper under the hopper-outlet $k'$, and as each cup or hole $g'$ comes to the "cut-away" of the circular plate or chute H, one or more grains are cast into said chute, and thereby conveyed into a delivery-spout, M, which is attached to the middle bar, $a$, of the frame.

It will be observed that the dropping-wheel and chute are located transversely to the line of draft, so as to dispense with any spur-wheels or other mechanism.

On the ends of the beams $a'$ are placed the plow-standards N N N, to which are indirectly attached the furrow-opener O and the coverers P P, which may be of any suitable pattern. I connect these plows with their standards by means of the bearings Q and shoes R. The bearings may be rigidly secured to the plows by screws, bolts, or rivets, or in any other suitable manner, while the shoes have a journal, $r$, on which the bearings, with the plow, may be turned and held by a clamp, $r'$, at a greater or less degree to one side or to the middle.

The shoes R are formed of a metallic plate folded in the middle to rest upon the standard and extend down each side thereof. At the lower end is the journal $r$, near the middle the fulcrum pin or pivot, and at the upper end are the holes $r^2$, in one of which is placed the cross-pin $r^3$, which may be a wooden break-pin if the planter is to be used in stony or stumpy land. These means of connecting a plow with its standard allow the pitch and exact position of the plow to be regulated with great facility. I may use a shoe in which to set the front plow or shovel when moving to or from the field and connect it by a chain with the front of frame.

Having thus described all that is necessary to a full understanding of my invention, what I claim as new, and desire to protect by Letters Patent, is—

1. In a seed-planter, the three-beamed frame A, provided with the top bearings, $a'\ a'\ f\ f$, the axle B, arranged loosely in said bearings $a'$, carrying the ground-wheels C C, and having a crown-wheel between said bearings $a'\ a'$, and the longitudinal shaft F, arranged loosely in the bearings $f\ f$, all combined and arranged as shown, and for the purpose of operating the dropper-wheel.

2. In a seed-planter, the combination of a hopper, K, having the bottom $k$ and outlet $k'$, a dropper-wheel, G, having the right-angled flange $g$ perforated at $g'$, and the chute H, made fast to the hopper-bottom $k$, inclined forwardly as well as downwardly and cut out where the chute comes under the hopper-outlet $k'$, as and for the purpose specified.

3. In a seed-planter, the combination, with the three-beamed frame A and hopper K, of the three braces $k^2\ k^2\ k^2$, connecting it with each of the beams $a\ a\ a$, and all co-operating to support it in the rear of as well as above the frame A, as and for the purpose set forth.

FRANCIS M. LUCAS.

Witnesses:
S. P. BUCKMASTER,
MERTON MEEKER.